United States Patent
Kelly et al.

(10) Patent No.: US 7,486,201 B2
(45) Date of Patent: Feb. 3, 2009

(54) COMBINED PERSONALIZED TRAFFIC AND WEATHER REPORT AND ALERT SYSTEM AND METHOD

(75) Inventors: Terence F. Kelly, Madison, WI (US); Victor W. Marsh, Fitchburg, WI (US); Christopher W. Kelly, Philadelphia, PA (US); Kevin E. Baird, Madison, WI (US)

(73) Assignee: MyWeather, LLC, Madison, WI (US)

( * ) Notice: Subject to any disclaimer, the term of this patent is extended or adjusted under 35 U.S.C. 154(b) by 118 days.

(21) Appl. No.: 11/328,730

(22) Filed: Jan. 10, 2006

(65) Prior Publication Data

US 2007/0159355 A1 Jul. 12, 2007

(51) Int. Cl.
  *G08G 1/09* (2006.01)
(52) U.S. Cl. ............. 340/905; 340/907; 340/908.1; 340/910; 340/917; 340/934; 340/939; 455/414.3; 701/200; 701/208; 701/213
(58) Field of Classification Search ............ 340/905, 340/907, 908.1, 910, 917, 934, 939, 995; 455/414.3, 456; 701/3, 200, 208, 213
See application file for complete search history.

(56) References Cited

U.S. PATENT DOCUMENTS

| | | | |
|---|---|---|---|
| 5,699,056 A * | 12/1997 | Yoshida | 340/905 |
| 5,729,214 A * | 3/1998 | Moore | 340/905 |
| 5,771,484 A * | 6/1998 | Tognazzini | 701/117 |
| 6,389,290 B1 | 5/2002 | Kikinis et al. | |
| 6,404,880 B1 * | 6/2002 | Stevens | 379/221.11 |
| 6,498,987 B1 | 12/2002 | Kelly et al. | |
| 6,654,689 B1 | 11/2003 | Kelly et al. | |
| 6,823,263 B1 | 11/2004 | Kelly et al. | |
| 7,181,346 B1 | 2/2007 | Kleist et al. | |
| 2006/0178807 A1 * | 8/2006 | Kato et al. | 701/117 |
| 2007/0049260 A1 * | 3/2007 | Yuhara et al. | 455/414.3 |
| 2007/0155404 A1 * | 7/2007 | Yamane et al. | 455/456.1 |
| 2007/0219707 A1 | 9/2007 | Auxer et al. | |

OTHER PUBLICATIONS

Yahoo!, Weather and Traffic, pages printed from website, date last visited Aug. 12, 2005, 2 pages, http://www.yahoo.com/.
Yahoo!, Chicago, IL Weather-Extended Forecast, pages printed from website, date last visited Aug. 12, 2005, 2 pages, http://www.yahoo.com/.

(Continued)

*Primary Examiner*—Tai T Nguyen
(74) *Attorney, Agent, or Firm*—Boyle Fredrickson, S.C.

(57) ABSTRACT

A system and method for generating and delivering to users combined personalized traffic and weather report and alerts including forecast traffic and weather conditions. A user defines a travel route of interest and alert conditions. Based on current weather information, weather forecast information, current traffic information, and forecast traffic conditions a combined traffic and weather report for the user specified route is generated and delivered to the user via the internet and/or a wireless communications channel. The combined report may include a graphic display on a map background showing traffic conditions with a graphic representation of weather conditions overlaid thereon along with a tabular representation of traffic and weather conditions including forecast traffic and weather conditions for a plurality of future time periods. Alerts are generated and delivered when the traffic and weather alert conditions are satisfied.

24 Claims, 5 Drawing Sheets

OTHER PUBLICATIONS

Yahoo!, Yahoo! Maps and Traffic-Chicago, IL, pages printed from website, date last visited Aug. 12, 2005, 2 pages, http://maps.yahoo.com/maps_result?csz=Chicago%2C+IL&ds=n&&zoomin=yes&BFKey. . . .

Madison.com, Trafficcast Makes Deal With Yahoo, pages printed from website, date last visited Aug 11, 2005, 2 pages, http://www.madison.com/archives/read.php?ref=wsj:2005:04:14:412194:Business.

Traffic.com, chicago traffic report, pages printed from website, date last visited Aug. 11, 2005, 5 pages, http://www.traffic.com/Chicago-Traffic/Chicago-Traffic-Reports.html.

Traffic.com, chicago area weather, pages printed from website, date last visited Aug. 11, 2005, 3 pages, http://www.traffic.com/Chicago-Traffic/Chicago-Traffic-Weather.html.

Myweather.net, TrafficWeatherCast, page printed from website, date last visited Jul. 28, 2005, 1 page, http://www.myweather.net/traffic2.jpg.

* cited by examiner

User Profile

Name: Jane Taylor
Address: 67 W North St
City: Dallas    Zip: 66532    State: TX ← 40
Email Address: name@email.com

Destinations

Location 1: Home — 42
Address: 67 W North St
City: Dallas    Zip: 66532    State: TX — 43

Location 2: Work
Address: 900 Michigane Ave
City: Dallas    Zip: 66514    State: TX ← 41

Location 3: Mom's House
Address: 3 Mayflower Cir
City: Mesquite    Zip: 66325    State: TX Add a new location>>

Commutes and Alerting

Route 1
Commute Start Point: Home
Commute End Point: Work
Delivery Method:  ☐ Web browser
                  ☐ Mobile device
                  ☐ Desktop application
                  ☐ In-car navigation system
Alert Time: 1 pm

Route 2
Commute Start Point: Home
Commute End Point: Daycare
Delivery Method:  ☐ Web browser ← 44
                  ☐ Mobile device
                  ☐ Desktop application
                  ☐ In-car navigation system
Alert Time: 1 pm

Route 3
Commute Start Point: Mom's house
Commute End Point: Whole Foods Market
Delivery Method:  ☐ Web browser
                  ☐ Mobile device  ← 47
                  ☐ Desktop application
                  ☐ In-car navigation system
Alert Time: 1 pm — 48

Specify a new route>>

[ Save Profile ]

FIG. 2

COMBINED PERSONALIZED TRAFFIC AND WEATHER REPORT AND ALERT SYSTEM AND METHOD

FIELD OF THE INVENTION

The present invention pertains generally to systems and methods for generating and presenting traffic and weather reports and alerts and, more particularly, to a system and method for generating and presenting a combined traffic and weather report including traffic and weather forecast information and for generating and delivering alerts based on a combination of traffic and weather information.

BACKGROUND OF THE INVENTION

Traffic and weather go together. Traffic and weather represent two of the most practical categories of information and news that many individuals use almost every day in planning and living their daily lives. Thus, it makes sense that traffic and weather information are most often provided together, side by side. For example, drive time radio will often provide a traffic report, followed immediately by a weather report, or vice versa, to listening commuters several times an hour. Similarly, on-line services will offer or present traffic and weather reports in close proximity, e.g., on a website offered by the same provider. Thus, for example, on a general news or information website one will typically find the links for traffic and weather reports close together, or even right next to each other.

Besides their common importance in people's lives, traffic and weather also go together in another sense. Weather conditions, particularly severe weather conditions, often can effect traffic conditions. Normal traffic conditions and drive times can be affected significantly by severe weather conditions such as heavy rain, snow, ice, and the like.

Although traffic and weather do go together, currently traffic reports and weather reports are separately generated and combined typically only in the sense that they are presented together sequentially in time, e.g., one after the other as part of a radio report, or in cyber space, e.g., as adjacent links on a web page. Thus, it is left to the recipient of such separate traffic and weather reports to integrate the information received in their own mind to determine how the traffic and weather information being presented separately to them is likely to affect their life today. What is lacking and desired is a system and method for generating a truly integrated traffic and weather report which provides, via a single integrated presentation, a truly combined traffic and weather report that can be readily understood and applied by viewers thereof.

The weather report portion of conventional traffic and weather reports typically includes a report of current weather conditions as well as predicted or forecast weather conditions for the near future. Current weather condition information may be obtained from a variety of weather information sources, including weather radar systems (e.g., including the national NEXRAD weather radar system as well as live local weather radars), weather satellite imagery, automated and/or manned weather stations that record weather information such as wind speed, rainfall, humidity, temperature, etc., as well as human observation reports of current weather conditions. Information from weather information sources such as these, and others, is collected by a meteorologist or other weather reporter, e.g., with the help of a computer system, to generate a report of current weather conditions.

Some of the information on current weather conditions also may be fed, as initial conditions, into sophisticated computer implemented weather forecasting models. Current weather forecasting models are able to generate detailed predictions of various weather conditions (e.g., temperature, precipitation, wind speed, severe weather conditions, etc.) having a high degree of geographic and temporal resolution and with significant accuracy. (An example of such a weather forecasting model is the ADONIS Microcast weather forecasting model, available from Weather Central, Inc. of Madison, Wis.) The output of such a weather forecasting model also is provided to the meteorologist or weather reporter.

The current weather information and forecast weather information provided are combined by the meteorologist or weather reporter into a combined weather report. Such a weather report may take many forms, including a weather condition and forecast report that is read over the radio, a weather report including various computer generated graphics showing current and forecast weather conditions as presented in a televised weather report by a live on-screen presenter, or as a report of current and forecast weather conditions presented using text and graphics that are provided to viewers over the internet, e.g., on a web page. Such generalized weather reports are presented or otherwise provided to all who are interested in the general current and forecast weather conditions for a relatively large geographic area of interest, such as the area covered by a local television or radio station.

Generalized current and forecast weather condition reports of the type just described are valuable, but can be of limited value. Current and forecast weather conditions can vary significantly over the relatively broad geographic areas covered, for example, by a television or radio station. Thus, individuals viewing or listening to such general reports, or viewing such generalized weather forecasts for a geographic area as provided on the internet, may not obtain a good understanding of how current and forecast weather conditions are likely to affect them at a particular location within the broader geographic area covered by the report that is important to them, e.g., their home, school, place of work or business, etc.

To solve this limitation, systems and methods have been developed for generating and delivering to users truly personalized weather reports of forecast weather conditions and warnings of severe weather conditions for individual user specified locations of interest. For example, U.S. Pat. Nos. 6,498,987 and 6,823,263, entitled System and Method for Providing Personalized Weather Reports and the Like, describe the generation of such personalized weather forecast reports. In accordance with the systems and methods described, individuals are able to create a user profile specifying particular locations of interest to those individuals. Taking advantage of the high geographic and temporal resolution of the ADONIS Microcast model, for example, personalized weather forecast reports are generated specifically for each individual user defined location of interest. Such personalized weather reports are then delivered directly to the individual users, e.g., over the internet, to a personalized internet web page, or to a wireless device, e.g., a cellular phone, or other user communication device. Similarly, U.S. Pat. No. 6,654,689, entitled System and Method for Providing Personalized Storm Warnings, compares individual user specified locations of interest to the current position and predicted path of travel of severe weather. From this comparison a determination is made whether or not the severe weather is likely to affect the user location of interest. A personalized warning may thus be provided to the user, e.g., via e-mail or to another user communication device, indicating that severe weather is on the way, the type of severe weather, the distance of the severe weather from the user's specified location of interest, and/or the likely time of arrival of the severe weather condition at the user location of interest. The systems and methods described in these patents also allow the individual user great flexibility in determining the conditions under which such personalized weather reports or storm warnings are to be provided to the user, e.g., allowing the user to specify the particular type of severe weather conditions for which the user desires to receive such a warning.

The traffic report portion of current traffic and weather reports typically provides a report of current traffic conditions based on current traffic condition information. For example, for a radio broadcast traffic report current traffic condition information may typically be obtained from traffic observers. For example, observers in aircraft or in land vehicles may provide a visual report of current traffic conditions, including travel times along specific roadways between specific locations know to most commuters in an area. Such traffic observations also may be obtained using remote controlled video cameras placed along selected roadways that regularly experience significant traffic volume. Such observational information may be obtained directly by the entity providing the traffic report, and also from police reports, e.g., of accidents or other traffic tie-ups, and/or from citizen observer reports.

More advanced traffic reporting may employ automated traffic monitoring systems. Such systems currently are limited to relatively large urban areas that experience significant daily commuter traffic. Such automated traffic monitoring systems may include, for example, optical or vibration sensors that are placed along or in specific major roadways that experience significant commuter traffic. Such traffic sensor information may be fed, e.g., via a wired or wireless connection, from the sensors to a centralized computer system where this information, in combination with observational information, may be used to generate automatically, or semi-automatically, a report of current traffic conditions for the roadway being monitored.

An even more advanced method for monitoring traffic employs global positioning system (GPS) equipped cellular phones or similar communication devices. Such devices provide a very accurate indication of their current geographic position. By monitoring the position signals obtained from such devices located along a roadway the speed of travel of the devices, and, thus, of the vehicles in which they are located, along the roadway can be determined. (Such position information may be obtained from GPS equipped cellular telephones as long as they are turned on, whether or not a call is in progress using the cellular phone.) From the speed of traffic along a roadway determined in this manner current traffic conditions, including commute times, can be determined and incorporated into a report of current traffic conditions.

Using historical traffic data for particular travel routes in combination with current or predicted traffic affecting conditions a forecast of traffic conditions along a route may be obtained. For example, by analyzing historic traffic conditions a model of travel times along a section of roadway may be obtained for, for example, particular days, days of the week, seasons of the year, times of day, etc. By analyzing such historic traffic data the effect of various weather conditions on traffic conditions also may be determined and included in the traffic forecast model. Using such a model based on historic traffic information, along with known or predicted future conditions, e.g., predicted weather conditions from a weather forecast model, as discussed above, a forecast of traffic conditions, e.g., travel times, along a roadway may be determined. Such a traffic forecast may be included as part of the traffic report that is provided to users. Such traffic forecast generation and reporting is available, for example, from TrafficCast of Madison, Wis.

As with weather reports, traffic reports are most valuable if provided in a personalized manner to individual users. Current online systems, for example, may allow a user to designate a particular route of travel, e.g., a daily commute between home and work. Based on current and forecast traffic conditions a personalized traffic report may then be generated and provided. For example, such a personalized traffic report may show a map with the user specified route of travel highlighted and indicating travel times along the route, the location of accidents or other traffic delays, etc. Such a personalized traffic report may be generated automatically by a computer system based on the traffic information provided thereto by observers, and/or by automated traffic sensors and/or from traffic forecast models. Such personalized traffic reports may be provided to users via the internet, e.g., at a personalized web page generated for the user, or to a remote user communication device, such as a cellular telephone with graphic display capability, or the like.

Thus, personalized weather forecast reports and warnings, and personalized traffic reports are, to some degree, known. However, current systems do not provide a truly integrated traffic and weather report or, more particularly, personalized integrated traffic and weather reports and warnings or alerts. What is desired, therefore, is a system and method for generating a traffic and weather report and alerts of traffic and weather conditions of particular interest wherein the traffic and weather contents are fully integrated. Such an integrated traffic and weather report preferably provides both traffic and weather forecast information to users in a personalized, easily understandable, integrated, and interactive manner.

SUMMARY OF THE INVENTION

The present invention provides a system and method for generating and providing a combined traffic and weather report including a combined personalized traffic and weather report and personalized alerts of important current and predicted traffic and weather conditions. A combined traffic and weather report in accordance with the present invention provides traffic and weather forecast information and alerts together in an integrated form that is readily understandable by users and useful to them immediately for planning travel and other activities. The present invention preferably allows a user to specify a route of travel and particular traffic and weather conditions of interest. Based on the user's specified route of travel, current weather conditions, forecast weather conditions as obtained from a weather forecast model, current traffic conditions, and traffic forecast conditions, an integrated personalized traffic and weather report is generated. Such a report preferably presents both graphically and in tabular form simultaneously both the traffic and weather conditions along the user specified route for current and future time periods. Such a personalized traffic and weather report preferably highlights to users critical traffic and weather information, such as the location of accidents and other critical traffic conditions, severe weather, travel times, etc. Personalized alerts may be generated and delivered to users for critical current or forecast traffic and weather conditions that meet the user defined traffic and weather conditions of interest. A combined personalized traffic and weather report in accordance with the present invention preferably is interactive, allowing a user thereof, for example, easily to view traffic and weather conditions along the user selected route of interest for different time periods in the future, thereby allowing the user to determine the best time to make the trip, to select alternate routes, etc. Combined personalized traffic and weather reports and alerts in accordance with the present invention preferably may be delivered to users over the internet, e.g., at a web page accessible by the user, and/or to a user's wireless communication device, such as a graphics equipped cellular phone, in-car navigation device, or the like.

A system and method for generating and delivering a combined traffic and weather report and alerts in accordance with the present invention preferably is implemented for substantially automatic operation in a computer based system. Current weather information from a variety of weather sensors or other weather information sources, (e.g., weather radars, satellite imagery, automatic or manned weather stations, weather observers, etc.) is provided to the computer system. The output of a detailed weather forecast model, providing forecast weather conditions for time periods extending into the future, also is provided to the computer system. From the current weather condition and weather model data a forecast of weather conditions may be generated.

The computer system preferably is provided with current traffic condition information, e.g., from live observers and/or, preferably, from traffic sensors, such as optical or in the road vibration sensors, global positioning system (GPS) information from cellular phones or other devices in vehicles on the road, etc. Historic traffic data for traffic along particular traffic routes also preferably is provided to the computer system, e.g., in the form of a traffic model for the particular traffic routes. Based on such current traffic information, historic traffic data, and current and forecast weather conditions along the travel routes, a forecast of traffic conditions along major travel routes is generated. (The traffic forecast and weather forecast may be generated by separate computer systems with the separate traffic and weather forecast information communicated to one of the computer systems, or a third computer system, for the generation of a combined traffic and weather report in accordance with the present invention, as will be described in more detail below.)

The computer system preferably also is in communication with a plurality of users. For example, a user may communicate with the computer system via the internet, e.g., via e-mail and/or a web page generated and maintained by the computer system, via a cellular phone or other wireless connection, such as an in-car navigation system, or via any other electronic communications media or device. Using the internet or other communications media the user preferably is able to define a user profile including the specification of one or more particular travel routes of interest to the user. The travel routes of interest may include a user specified starting or destination location and user specified way points along the route. Alternatively, the user may specify only the starting and destination points, with the route between those locations selected automatically by the system. The user may also specify particular traffic and weather conditions of interest for which the user would like to receive alerts when current or forecast traffic and weather conditions satisfy the user selected conditions. The user defined profile information, including the user defined routes of interest and traffic and weather conditions of interest, are stored by the computer system in a user profile database.

In accordance with the present invention, weather model data from a high geographic and temporal resolution weather model is used to generate a weather forecast for a plurality of time periods for a geographic area including the user specified travel route of interest. Similarly, historic traffic data, current traffic information, current weather information, and forecast weather information for the geographic area are used to generate a traffic forecast for travel routes in the geographic area including the user specified travel route of interest. Based on the generated weather forecast and traffic forecast and the user specified route information a combined personalized traffic and weather report and forecast for the specific user defined route of interest is generated. The combined personalized traffic and weather report may then be delivered to the user. For example, the combined personalized traffic and weather report forecast in accordance with the present invention may be delivered to the user at a personalized internet web page accessible by the user, or to a wireless user communication device, such as the user's cellular telephone or in-car navigation system or the like.

A combined personalized traffic and weather forecast report in accordance with the present invention may preferably include integrated and user interactive graphical and tabular presentations. For example, the graphical portion of the combined personalized traffic and weather report forecast may include a map or other geographic background with the user specified travel route highlighted. Traffic conditions, e.g., traffic congestion or travel times, for a particular user selected current or future time period may be indicated by different colors or icons along the illustrated travel route. Current or forecast weather conditions for the particular time period may be indicated as a graphical overlay or icons on the map or other geographic background along with the illustrated travel route. For example, the weather information may be displayed as different color contours indicating various weather conditions such as precipitation, wind gusts, etc. along the travel route at the particular selected time. The time period selected to be displayed in the graphical geographic portion of the display may be selected by the user using a user interface to step through time periods, either forward or backward in time, or to play the illustrations for a series of time periods in sequence to show changing traffic and weather conditions over time in an animated or semi-animated manner.

The tabular portion of the combined personalized traffic and weather forecast report in accordance with the present invention preferably is displayed simultaneously with the graphical or geographic presentation. The tabular presentation includes entries (e.g., rows or columns) for a plurality of past, current, and future time periods. Each entry includes a textual and/or graphical representation of both traffic and weather conditions along the user specified travel route for the corresponding time period. For example, the tabular presentation may include traffic information such as average driving speed and total travel time along the route for travel along the route beginning at the indicated time period. Weather conditions such as temperature, wind speed, wind direction, sky conditions, precipitation, humidity, etc. may also be included for each time period in the tabular presentation. Different colors or other indicia may be employed in the tabular presentation to indicate particular travel or weather information of interest. For example, different colors may be used to indicate time periods where particularly long travel times are predicted. Thus, by glancing at the tabular presentation a user is able to determine quickly the time periods providing the best travel and weather conditions along the route in the near future, or to determine the particular travel and weather conditions at a particular time period.

The graphical geographic and tabular portions of the combined personalized traffic and weather report presentation preferably are integrated such that the traffic and weather information for the time period currently presented in the graphical portion of the presentation is highlighted in the tabular presentation. As the graphical user interface is employed to changed the time period represented in the graphical portion of the presentation the corresponding highlighted portion of the tabular presentation is simultaneously changed. The tabular presentation may also be employed as a graphical user interface for the graphical geographic portion of the presentation. For example, the user preferably may be able to select a time period in the tabular portion of the presentation, e.g., by using a mouse or other similar device to click on the appropriate portion of the tabular presentation. The selected time period in the tabular presentation may then be highlighted in response to the user selection with the corresponding combined graphical presentation of traffic and weather conditions for the selected time period displayed in the graphical geographic portion of the presentation.

In accordance with the present invention traffic and weather alerts may be provided to users. Users may specify in their user profile that they would like to receive traffic and weather alerts for the routes of travel that they have defined or selected. The user may also specify when the alert is to be delivered, the nature of the alert, and the user delivery address or device to which the alert is to be delivered. For example, the user may specify a time each day that an alert with forecast traffic and weather conditions for the user's specified travel time and route are delivered to the user via e-mail, to the user's cell phone or other mobile device, or to the user's in-car navigation system. Alerts for particular travel conditions and/or travel weather related problems may similarly be generated and delivered to the user. Such alerts are generated and delivered automatically by the system by comparing the traffic and weather forecast information for the area including the user's travel route with the user information in the user profile defining the alerts to be provided.

Further objects, features, and advantages of the present invention will be apparent from the following detailed description thereof as taken in accordance with the accompanying drawings.

BRIEF DESCRIPTION OF THE DRAWINGS

FIG. 2 is an exemplary graphical user interface as may be employed in a system and method in accordance with the present invention for establishing a user profile for generating and providing combined personalized traffic and weather reports and alerts in accordance with the present invention.

DETAILED DESCRIPTION OF THE INVENTION

The present invention provides a system and method for generating and providing to users combined personalized traffic and weather reports and alerts including integrated traffic and weather forecasts. The present invention will be described in detail herein with reference to individual users, however, it should be understood that the present invention also is applicable to business and other users thereof. Also, the present invention may be employed to generate and provide combined traffic and weather forecast report that are not specific to individual users, but more general in nature. For example, the present invention may be used to generate and provide a combined traffic and weather forecast report that provides combined traffic and weather forecast information for a travel route or routes, city or portion thereof, or other geographic area, and that is useful and presented to many individuals via the communications channels described herein.

Figure 1:
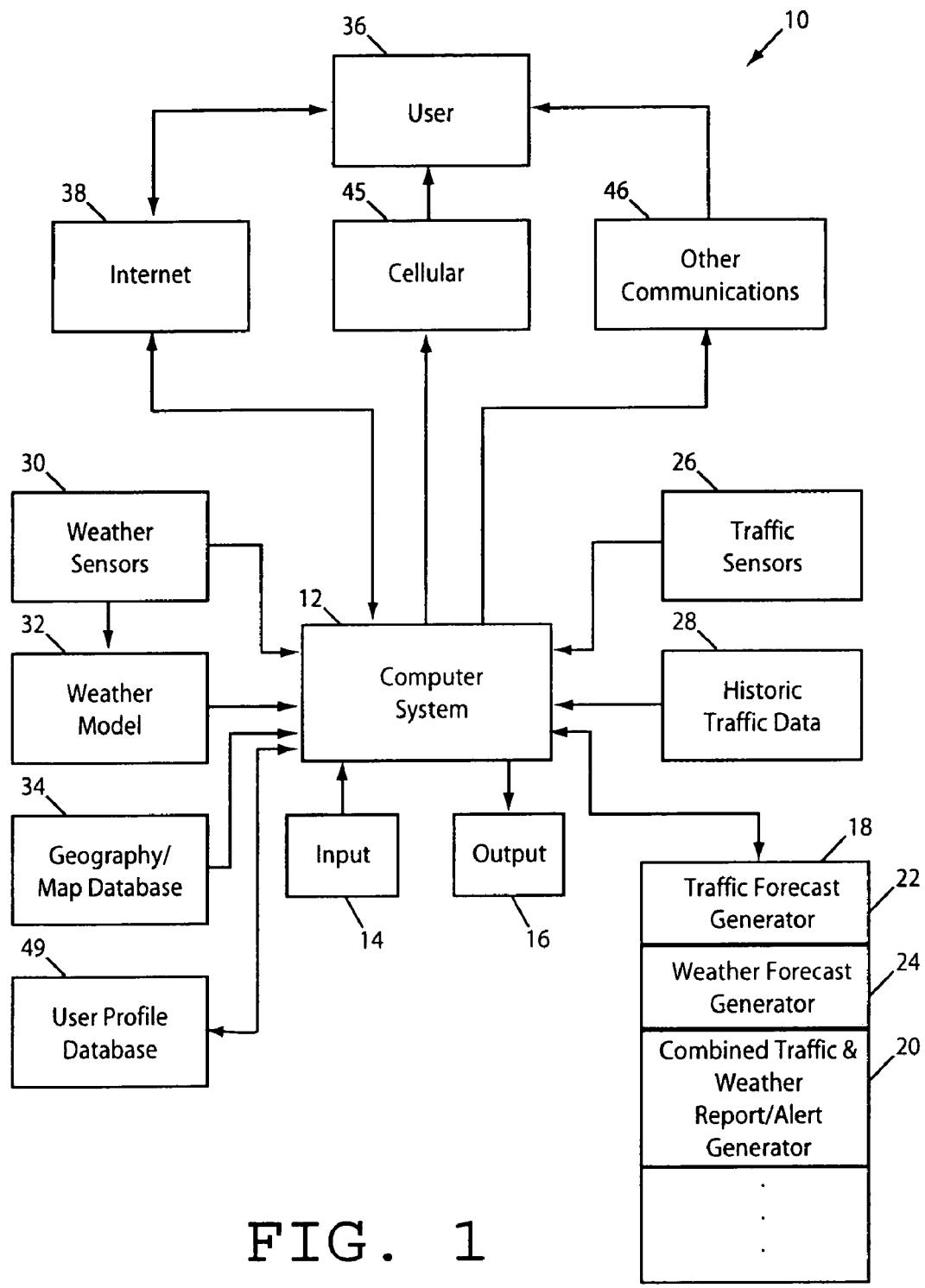
FIG. 1 is a schematic block diagram of an exemplary system in accordance with the present invention for generating combined personalized traffic and weather report and alerts.

An exemplary system 10 for generating and delivering to a user a combined personalized traffic and weather report and alerts in accordance with the present invention is illustrated in, and will be described in detail with reference to, FIG. 1. The present invention preferably is implemented for substantially automatic operation in a conventional computer system 12. It should be understood that the computer system 12 may be a single computer system or multiple computers or computer systems networked or otherwise integrated together to implement the functionality of a combined personalized traffic and weather report and alert generation and delivery system and method in accordance with the present invention. The capacity, operating speed, and other functional characteristics of the computer system 12 will depend upon various operational considerations, such as the type and volume of information to be employed by the system and the number of individual and business users to be provided combined personalized traffic and weather reports and alerts thereby.

Conventional input devices 14 (e.g., keyboard, mouse, etc.) and output devices 16 (e.g., monitors, printer, etc.) may be couple to the computer system 12 in a conventional manner. The conventional input 14 and output 16 devices allow an operator of the computer system 12 to interact therewith to monitor operation thereof and maintain operation of the system 10.

The computer system 12 is provided with conventional memory devices 18 (e.g., ROM, RAM, disc memory, etc.). Memory 18 may include stored therein a computer program or programs 20 for generating and delivering to users a combined traffic and weather report presentation and alerts in accordance with the present invention. Memory 18 may also include stored therein related computer programs for generating the inputs necessary for generating a combined traffic and weather report presentation and alerts in accordance with the present invention. For example, such computer programs may include a traffic forecast generator 22, for generating traffic forecast information for use in the combined personalized traffic and weather report presentation and alerts, and/or a weather forecast generator 24, for generating weather forecast information to be used in the combined traffic and weather report presentation and alerts. Alternatively, the traffic forecast generator 22 and/or weather forecast generator 24 functions may be performed by a separate computer system or systems with the forecasts generated thereby provided to the computer system 12 for use in generating a combined personalized traffic and weather report and alerts in accordance with the present invention. Other conventional computer programs for general operation of the computer system 12, e.g., operating systems and the like, also may be provided in memory 18. Based upon the detailed functional description, flow chart diagrams, and exemplary presentation displays provided herein a person of ordinary skill in the art of computer programming for traffic or weather report presentations will be able to implement a system for generating and delivering combined personalized traffic and weather reports and alerts in accordance with the present invention using conventional programming techniques and languages on a conventional computer system running a conventional operating system.

A combined personalized traffic and weather report and alerts in accordance with the present invention are generated in part from current traffic information obtained from a variety of traffic sensors 26. Such traffic sensors 26 may include sensors that provide traffic information automatically, via a conventional wired or wireless communications channel, to the computer system 12. Such traffic sensors may include, for example, optical or vibration or other sensors mounted along or in selected roadways. The signals provided by such sensors may be used to determine current traffic volume and speed along sections of the monitored roadways. The traffic sensors 26 may include other automated forms of obtaining traffic related information, such as the position information obtained from global positioning system (GPS) equipped cellular phones in vehicles traveling along selected roadways. (Such position information may be obtained from these GPS equipped devices as long as the devices are turned on, and whether or not the devices are being currently used to make a call.) The position information that is obtainable from such wireless communication devices may be used to determine the speed of travel of the vehicles in which these devices are contained along the roadway. The traffic sensor 26 information employed may also include observer information, e.g., from airborne or land based observers, traffic cameras mounted along roadways, or the like, which is manually entered into the computer system 12.

The computer system 12 preferably also employs historic traffic data 28. The historic traffic data 28 may be based, for example, on stored traffic information obtained from the variety of traffic sensors 26. The historic traffic data 28 is analyzed to provide a model of traffic conditions based on factors such as the day of the week, time of day, time of year, weather conditions, etc. Thus, using such historic traffic data 28 in combination with predicted weather conditions and other information a forecast of traffic conditions for selected roadways may be determined. Conventional current and future methods for generating such a traffic forecast may be employed by the computer system 12. For example, a system and method for generating a traffic forecast in this manner is available from TrafficCast of Madison, Wis.

The computer system 12 also employs current weather information that may be received from a variety of weather sensors or systems 30. Such sources 30 of weather information may include weather radars (including, e.g., weather information from the government operated NEXRAD weather radar system as well as from live local weather radars), weather satellite imagery, weather information from remote or local manned or automated weather stations, etc. The weather sensor information 30 may also include weather observation reports that are entered manually into the computer system 12.

Forecast weather information may be obtained by the computer system using a computer implemented weather forecasting model 32. The weather forecasting model generates weather forecast data for a geographic area based on initial weather conditions provided thereto by, e.g., one or more weather or other atmospheric condition sensors 30. An accurate computer implemented weather forecasting model having a high degree of temporal and geographic resolution is preferred. An example of such a weather forecasting model is the ADONIS Microcast model, available from Weather Central, Inc. of Madison, Wis. Such a weather forecasting model 34 may be run on the computer system 12 itself, or on a separate computer system with the weather forecast model data generated thereby provided to the computer system 12.

As will be discussed in more detail below, the computer system 12 employs current and forecast weather information and current and forecast traffic information to generate a personalized combined traffic and weather report for a user defined travel route. The combined traffic and weather report preferably includes a graphic representation of traffic and weather conditions overlaid on a map background showing the user defined travel route. To generate such a report presentation the system 10 preferably employs geographic and map data as may be stored in one or more geography/map databases 34 accessible by the computer system 12. For example, the geography/map database 34 may include digital geography and map data for all geographic areas for which the system 10 may generate combined personalized traffic and weather reports in accordance with the present invention. In particular, the geography/map database 34 preferably includes detailed geographic location information and graphical representation data for the various roadways and traffic routes for which the system 10 is to provide personalized combined traffic and weather reports. Such digitized geographic and map data is available from various commercial providers thereof.

The computer system 12 is in communication with a plurality of system users 36 so as to receive user profile information from such users 36 and to delivery personalized combined traffic and weather reports and alerts generated by the system 10 to the users 36. Various communications channels may be employed to provide such communication between a user 36 and the system 10.

For example, the user may be prompted via an appropriate graphical user interface provided on a web page via the internet 38 to enter various user information defining a user profile. An exemplary graphical user interface of this type is illustrated in FIG. 2. Such user profile information may include general identification information 40, such as the user's name and other general identification and demographic information, as well as billing information if a charge is to be made to the user for providing the personalized combined traffic and weather reports and alerts in accordance with the present invention.

The user 36 will also be prompted to define one or more personal travel routes for which the user 36 is interested in receiving personalized combined traffic and weather reports and alerts. The user 36 may define such routes employing a user interface that is presented in the form of a road map, wherein the user 36 employs an input device, such as a mouse, to click on the several way points that define the personal travel route. Geography data from the geography/map database 34 may be employed by the computer system to generate such a geography based user interface.

Alternatively, the user 36 may be provided a textual interface or other method to define the personal travel route of interest. For example, as illustrated in the exemplary graphical user interface 39 of FIG. 2, the user may be prompted to define several starting or destination locations. Each such user defined location 41 has a user provided title or label 42 (e.g., home, work, school, etc.) and user provided address 43 or other information to define the physical location of the user defined location. Geography data from the geography/map database 34 may be employed by the computer system to translate the address 43 or other information provided by the user to latitude/longitude or another form used by the system to compare the user defined locations to traffic and weather information used by the system to generate personalized combined traffic and weather reports and alerts in accordance with the present invention. The user may then specify one or more travel routes or commutes 44 by selecting from among the previously defined personalized starting and destination locations 41. The route between the selected starting and destination locations may preferably be generated automatically by the system, using known methods to select the travel route (e.g., using major roadways between the selected starting and destination locations). Alternatively, the user may be able to define further manually the travel route between the starting and destination locations, e.g., by selecting the roadways to be traveled or way points between the starting and ending locations.

The user 36 may also be prompted to provide one or more contact addresses to which the personalized combined traffic and weather report and/or weather alerts to be generated by the system are to be delivered. The contact address may be an e-mail address, for reports and alerts to be delivered via e-mail over the internet 38, a telephone or data address for a graphics equipped cellular phone 45, or for any other wired or wireless communication device 46, e.g., and in-car navigation system, via which personalized combined traffic and weather reports and alerts in accordance with the present invention may be provided by the system 10 to a user 36. Alternatively, or additionally, the computer system 12 may generate an address location, such as a personalized web page location on the internet 38, at which the personalized combined traffic and weather reports and/or alerts will be provided and made available to the user 36. This address location information may then be provided to the user 36 at the user provided contact address, e.g., via e-mail to the user provided e-mail address.

As illustrated in FIG. 2, for each travel route or commute 44 defined by the user the user may select the particular delivery method or device 47 by which weather reports and alerts may be delivered to the user for that route. As discussed above, reports and alerts may be delivered via the internet 38, e.g., to the user's web browser or desktop application, or to a cellular phone or other wireless mobile device or in-car navigation system.

In accordance with the present invention the user may define as part of the user profile traffic and weather alerts that are to be generated and delivered to the user at the user specified contact address or device. A generic alert may be delivered at a specified alert time 48 each day, as may be specified by the user 36 in the user profile, for each selected user travel route or commute. Such a generic alert may include a combined personalized traffic and weather report in accordance with the present invention for the user defined travel route, and/or any other traffic and/or weather related notices that may be of interest, such as the forecasted travel time along the user defined route based on the combined traffic and weather forecast. The user may also specify that alerts be provided if particular traffic or weather conditions occur or are forecast to occur. For example, the user may specify that alerts be provided if the forecast travel duration along the user defined travel route for a commute time specified by the user is particularly long, if a traffic affecting accident occurs along the user specified travel route, if travel weather problems are forecast to occur, etc. Various other or different alerts of this type may be user specified or generated automatically by the system in accordance with the present invention.

The user identification information, personal travel route information, contact address information, and alert timing and identification information provided by the user 36, e.g., over the internet 38 or other communications channel, and/or generated by the computer system 12 for the user 36, is saved as a user profile by the computer system 12 in a user profile database 49. As will be described in more detail below, the information stored in the user profile database 49 is employed by the system computer 12 along with current and forecast weather information and current and forecast traffic information to generate personalized combined traffic and weather reports and alerts for the user defined travel route and to provide such reports and alerts to the user 36.

Figure 3:
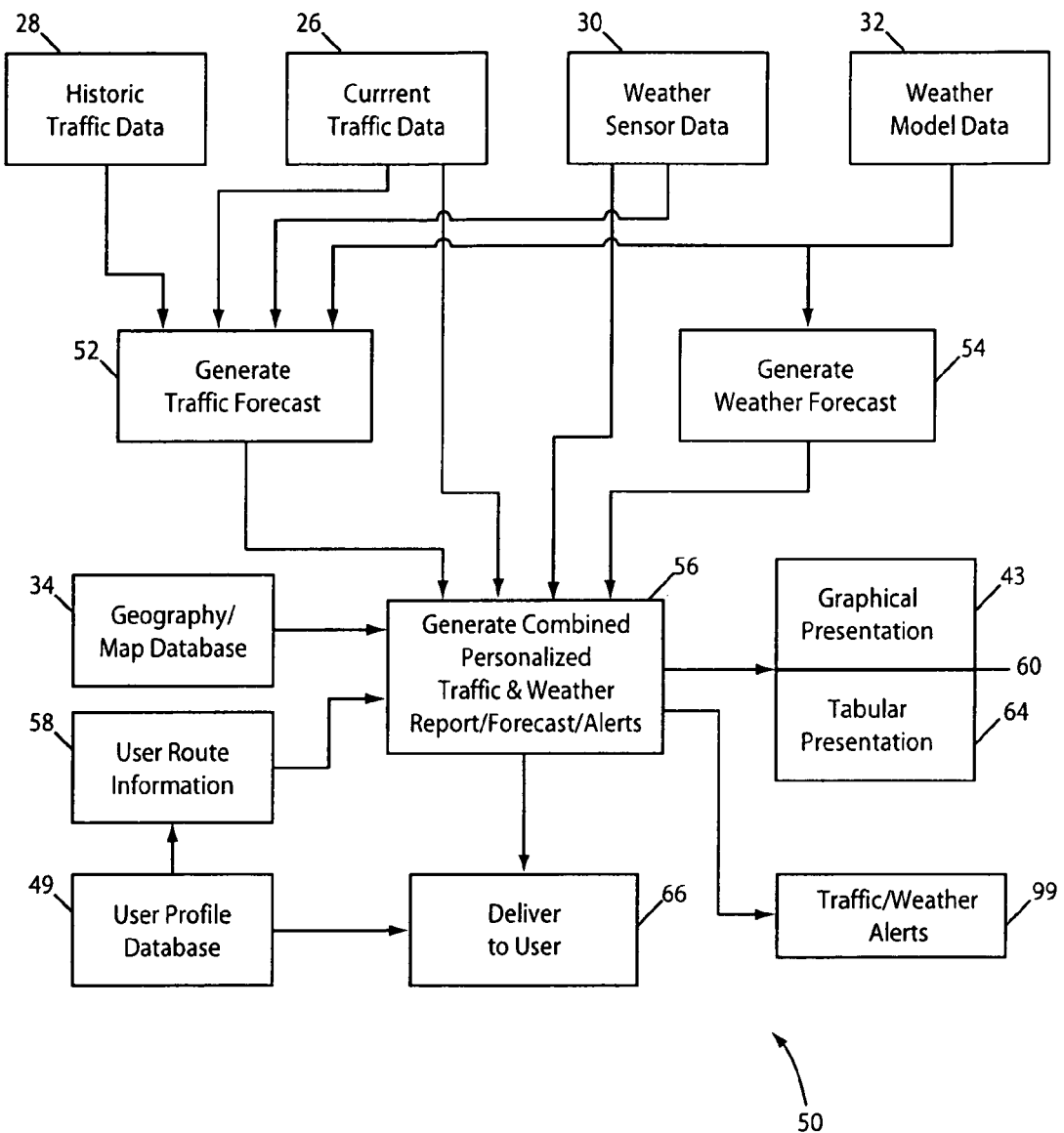
FIG. 3 is a schematic flow chart diagram of a method for generating a combined personalized traffic and weather forecast report presentation in accordance with the present invention.

An exemplary method 50 for generating a combined personalized traffic and weather forecast report and related alerts in accordance with the present invention, as may be implemented in the computer system 12, will now be described in detail with reference to FIG. 3. The process begins by generating a general traffic forecast 52 for the roadways in a selected geographic area that includes the user defined travel routes for one or more users and generating a weather forecast 54 for a geographic area that includes the user defined travel routes. The areas for which the traffic 52 and weather 54 forecasts are generated need not be identical, but must overlap in the areas for which personalized combined traffic and weather forecast reports in accordance with the present invention are to be generated. The traffic forecasts 52 and weather forecasts 54 may be generated in parallel or sequentially and, as mentioned above, may be generated on the same or separate computer systems.

The traffic forecast 52 may be generated based on historic traffic data 28 for the area, upon which a model of traffic conditions is based. Current traffic data 26 from one or more traffic sensors, current weather data 30 from one or more weather sensors, and forecast weather data 32 from a detailed and accurate weather forecast model are fed into the traffic forecast model along with other information regarding the time of day, day of the week, date, special events, etc. to generate the general traffic forecast 52. The traffic forecast 52 preferably provides traffic forecast information for roadways in the area of interest at a resolution of at least each hour for several hours into the future. The traffic forecast 52 may be regenerated periodically as necessary throughout the day or as new current traffic 26, current weather 30, or weather forecast 32 data is received by the system and that would likely affect the traffic forecast 52 output.

In a similar manner, forecast weather condition information from a weather model 32 is used to generate the general weather forecast 54 for the area including user defined travel routes of interest. A new weather forecast 54 may be generated periodically throughout the day, e.g., preferably at least four times a day, as new weather forecast data is received from the weather forecast model 32. Preferably high resolution weather forecasts 54 are generated for the area for at least each hour for several hours into the future.

In accordance with the present invention, the traffic forecast information 52 for an area including user defined travel routes and the weather forecast 54 for an area including the user defined travel routes are combined with current traffic data 26 from traffic sensor systems and observers and current weather data 30 from weather sensors and systems to generate 56 a combined personalized traffic and weather forecast report. For each user who has defined a personal travel route of interest user route information 58 is obtained from the user profile database 44. The user route information 58 is used to select the subset of current traffic 26, forecast traffic 52, current weather 30, and forecast weather 54 information that is relevant to the user. Based on this subset of traffic and weather information a combined personalized traffic and weather report, including a combined and integrated presentation of current and future traffic and weather information, is generated 56. As will be discussed in more detail below, the combined personalized traffic and weather report preferably includes both a graphical 62 and a tabular 64 presentation of current and future traffic and weather information that is directly relevant to the user defined travel route of interest.

Map and other geographic information from the geography/map database 34 may be used to generate the geographical presentation 62 portion of the combined personalized traffic and weather report. The combined personalized traffic and weather report as generated 56 may then be delivered 66 to the user, e.g., made available at a personalized user web page on the internet, sent via e-mail, transmitted to a graphics capable wireless device, etc.

Exemplary combined personalized traffic and weather forecast report presentations 60 in accordance with the present invention are illustrated in, and will be described with reference to, FIGS. 4 and 5. As mentioned above, such presentations may be provided to a user at a personalized internet web page provided to the user or via any other appropriate wired or wireless communications device. The presentation 60 preferably is provided via a communications medium and device that allows user interaction with the report presentation 60 which, as will be seen, includes both information elements as well as user interface elements.

As mentioned above, the combined personalized traffic and weather forecast report presentation may include both a graphical presentation portion 62 and a tabular presentation portion 64. The graphical presentation portion 62 preferably includes a map background display 68 with the user defined travel route 70 highlighted thereon. The route being displayed, and thus for which the personalized traffic and weather information is provided, may be described in a window or area 72 of the presentation 60 near the graphical presentation portion 62. This area 72 of the presentation provides a user interface that allows the user to select from among different travel routes of interest that may have been defined by the user as well as to select the direction of travel along those routes. (Since a combined traffic and weather report presentation in accordance with the present invention provides forecast traffic information, e.g. forecast travel times, that is dependent on direction of travel, it is important that the direction of travel (starting location and destination) be specified by the user.)

The graphical portion 62 of the combined traffic and weather report presentation 60 displays traffic and weather information for a specific current or future (or past) day and time period. The day for which the presentation is provided may be displayed to the user in the form of a pull-down menu user interface 74 that also allows the user to select the day for which combined traffic and weather information for the user travel route of interest is displayed. As will be discussed in more detail below, the time period represented in the graphical portion 62 of the presentation display 60 may be indicated in the tabular portion 64 of the display. Alternatively, the time period represented in the graphical 62 portion of the presentation display 60 may be presented elsewhere in or near the graphical portion 62 of the display 60 or elsewhere in the presentation display 60.

The time period represented in the graphical 62 portion of the presentation display 60 may be changed by the user using a graphical user interface 76 providing familiar control symbols corresponding to those provided on a video tape or DVD player. These controls allow the user to step forward in time by one time period, to step backward in time by one time period, to display the graphical display for several time periods in sequence automatically, and thus to provide an animated or semi-animated display of changing traffic and weather conditions in the graphical portion 62 of the presentation display 60, and to stop such an automated sequential display. Other time control functions may also or alternatively be provided. (If automatic playback of a series of graphical displays 62 is selected the system may display in sequence the graphical displays 62 for each time period throughout a day with the display for the first time period of the day displayed immediately after the display for the last time period of the day, thus providing in a loop an animated or semi-animated graphical display 62 of changing traffic and weather conditions throughout a single day selected by the user. Other sequences and time periods, e.g., a loop covering a portion of a day or several days, also or alternatively may be provided or employed.)

Both traffic and weather affecting the user defined travel route 70 for the time period displayed are presented in combination, simultaneously, in the graphical portion 62 of the combined traffic and weather report presentation 60. Thus, a user may determine at a glance the traffic and weather conditions affecting the travel route of interest for the time period displayed. Traffic and weather information presented simultaneously in the graphic portion 62 of the presentation display 60 may be presented in a variety of user selectable forms.

Figure 4:
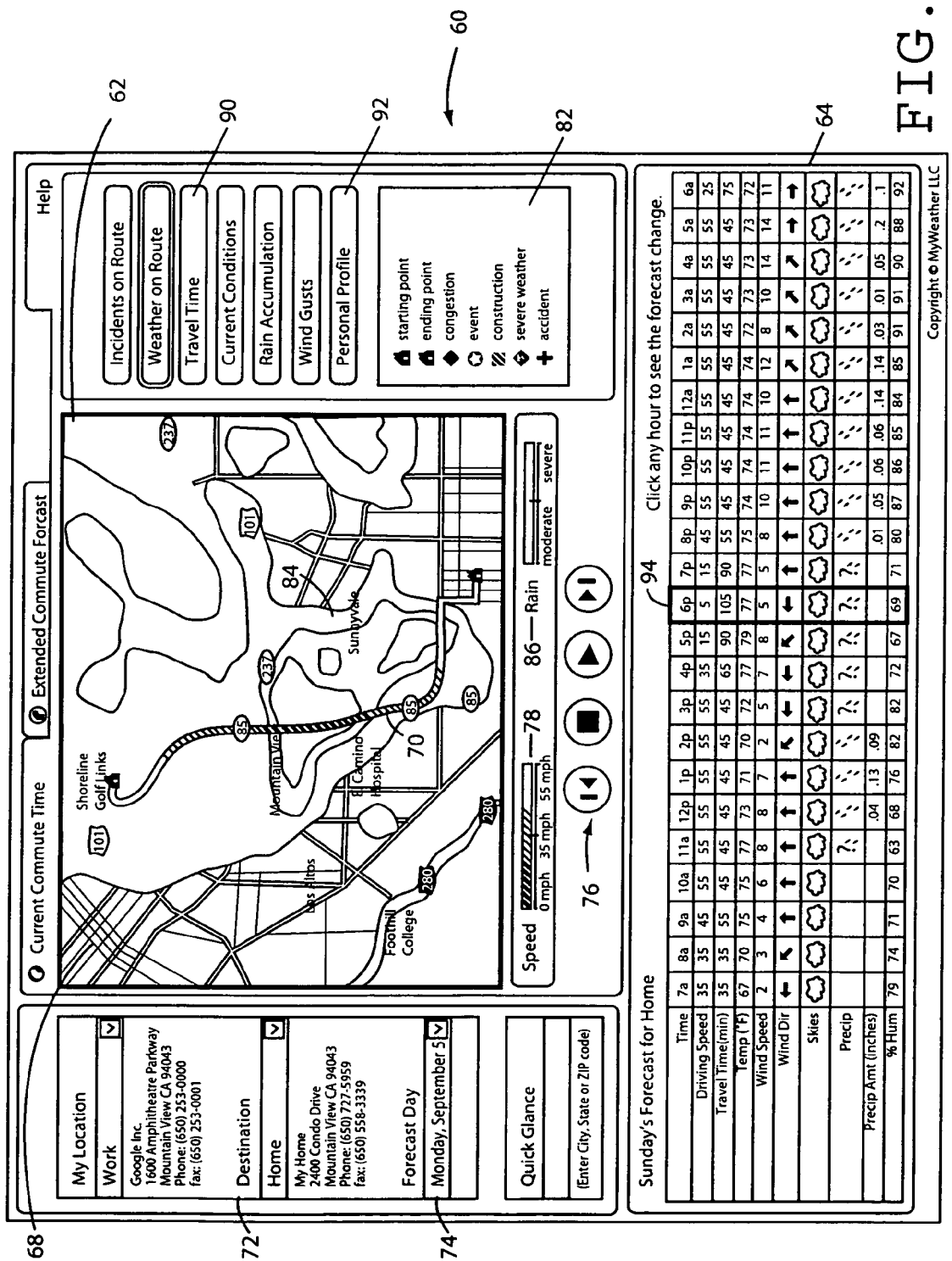
FIGS. 4 and 5 are screen shots of exemplary combined personalized traffic and weather report presentations in accordance with the present invention as may be provided to a user over the internet or other communications media.
Figure 5:
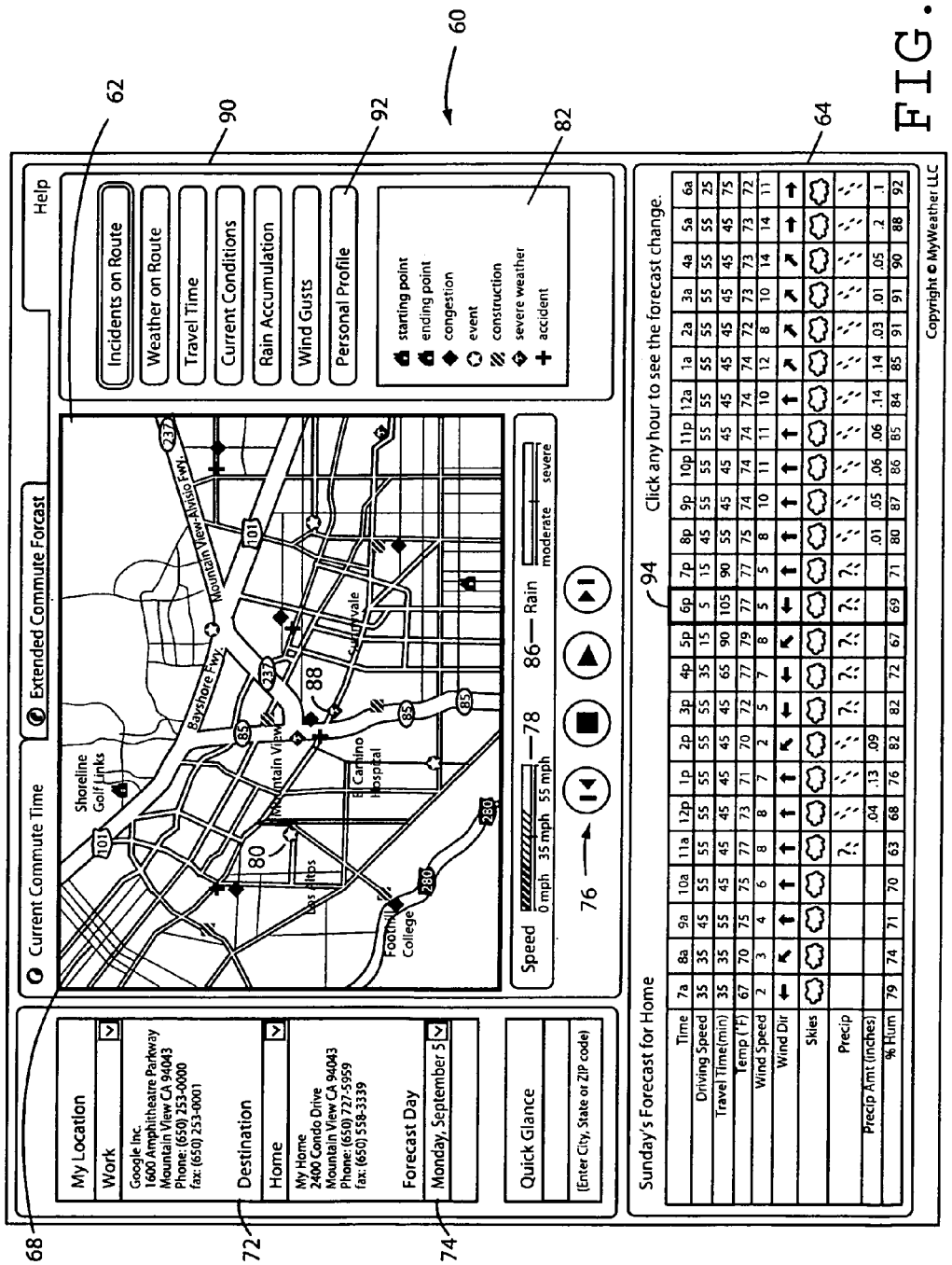

For example, as illustrated in FIG. 4, current or predicted traffic conditions along the user defined travel route 70 of interest may be represented by color coding along the route display to indicate traffic congestion or travel speeds. Preferably an intuitive color coding scheme is used, e.g., green representing fast traffic speeds, yellow slower traffic speeds, and red for heavy congestion stop-and-go traffic conditions. A graphical scale 78 may be provided on or near the graphical display 62 to provide an interpretation of the color coding used. Alternatively, or additionally, as illustrated in FIG. 5, icons 80 may be placed on the map background 68 in the area along and near the user defined travel route 70 to indicate the location of nearby traffic related events, construction, congestion, accidents, etc. An appropriate key 82 may be provided as part of the presentation display 60 to explain the meaning of any traffic related icons presented in the graphical portion 62 of the presentation display 60.

As illustrated in FIG. 4, current or predicted weather conditions along the user defined travel route may be represented by color contours of weather conditions, e.g., precipitation, overlaid 84 on the map background 68 along with the traffic information. The weather information overlay 84 preferably does not obscure the traffic related information presented in the graphical display 62. A graphical scale 86 may be provided on or near the graphical display 62 to indicate the type of precipitation being represented, e.g., rain, and the meaning of the color coding used in the color contour, e.g., different colors representing different precipitation intensities. As illustrated in FIG. 5, weather conditions, such as the location of severe weather (e.g., high winds, tornado, hail, etc.), may be represented by appropriate icons 88 displayed on the map background 68 along or near the user defined travel route of interest. The particular meaning of any weather related icons 88 used in this manner may also be provided in the key display 82.

A user interface 90 preferably is provided as part of the presentation display 60, e.g., on or near the graphical portion 62 thereof, whereby the user may select the traffic and weather information and the form thereof that is to appear in the graphical portion 62 of the display 60. For example, as illustrated in FIGS. 4 and 5, the user interface 90 may include virtual buttons that allow the user to select for display traffic incidents along the user defined route of travel, weather along the user defined travel route, travel time along the travel route, current traffic and weather conditions, rain accumulation, and wind gusts. (A button 92 also may be provided on the user interface 90 to allow the user to access a menu for maintaining or updating the personal profile of the user as saved in the user profile database 44. The user may access this menu to, for example, change the user contact address to which the combined personalized traffic and weather report is to be delivered or to change the user's defined travel route of interest or to add new personal travel routes to the user profile.) Other user interface options may also or alternatively be provided to provide traffic and weather information together on a map background 68 in a graphical display 62 in a form other than that illustrated and described by example herein.

The tabular portion 64 of a combined traffic and weather report presentation 60 in accordance with the present invention provides traffic and weather information for a user defined travel route simultaneously for a plurality of time periods, including forecast traffic and weather conditions for future time periods. The tabular presentation includes an entry 94, in the illustrated case columns, although the entries could also be in the form of rows, for each time period. Preferably entries 94 for at least each hour throughout an indicated day 74 are provided in the tabular display 64, although more or fewer entries 94 per day could be provided. Each entry 94 includes an indication of the time period represented thereby as well as text and/or graphics indicating traffic and weather conditions for the user defined travel route for that time period. Exemplary traffic information that may be included in the tabular entry 94 for each time period includes average travel speed and forecast travel time along the route (for travel starting at the indicated time). Time periods during which travel speeds are particularly slow and travel times particularly long may be indicated by color coding of the appropriate traffic condition information included in the entries 94. Weather information included for each time period in the tabular presentation 64 may include, for example, temperature, wind speed, wind direction, sky conditions, precipitation, and humidity. The weather information may be provided in textual and/or graphical form. For example, symbols in the tabular display 64 may be used to indicate precipitation type as well as relative intensity. Weather conditions of note, e.g., daily high and low temperatures, may be indicated, e.g., by appropriate color highlighting, in the tabular portion 64 of the display 60. It should be noted that traffic and weather condition information, including forecast traffic and weather condition information, in addition to and/or other than that illustrated and described herein may be included in the tabular portion 64 of a combined personalized traffic and weather report presentation 60 in accordance with the present invention.

The weather information included in the tabular portion 64 of the combined traffic and weather report presentation 66 may be the weather conditions, e.g., forecast weather conditions, as determined from weather forecast model data, for the time indicated and for a particular location along the user defined travel route. For example, the weather conditions provided in the table 64 may all be for the starting location or destination point of the travel route, and this may be user selectable. Alternatively, the weather information included in the tabular presentation 64 may be for a mid-point or other point along the user defined travel route.

The tabular portion 64 of the combined traffic and weather report presentation 60 may also be used to provide a graphical user interface to the graphical portion 62 of the presentation, thereby integrating the two portions 62 and 64 of the presentation. For example, the time period currently represented in the graphical portion 62 of the presentation 60 may be highlighted in the tabular portion 64 of the presentation 60. By selecting any entry 94 in the table 64, e.g., using a user input device such as a mouse, the traffic and weather information displayed in the graphical portion 62 of the presentation 60 may be changed to that for the time period indicated by the selected table entry 94. Thus, the user is able easily to display in graphical form in the graphical portion 62 of the presentation 60 the combined traffic and weather information presented for any time period entry in the tabular portion 64 of the presentation.

A combined traffic and weather forecast report of the type described herein may preferably be generated for individual users personally based upon the information provided in a personal user profile, as discussed above. However, such a combined traffic and weather forecast presentation also may be generated for popular travel routes and surrounding areas and provided to a more general audience that may find such a combined report useful. In this case, rather than basing the combined traffic and weather forecast report on travel route information defined in a user profile, such reports in accordance with the present invention are generated based on pre-established travel routes that may be of general interest. The resulting combined traffic and weather forecast report in accordance with the present invention may then be made available generally, either to the general public or to subscribers, via one or more of the communications channels discussed above. For example, such a combined report may be broadcast as part of a televised presentation or made available at a web site on the internet.

Returning to FIG. 3, combined personalized traffic and weather alerts 99 in accordance with the present invention are generated using a process similar to that used to generate the personalized traffic and weather forecast report 66. Such an alert 99 may be considered a special form of a combined traffic and weather forecast report that is delivered to a user 66 via a specified communications channel at user specified times or if user specified or other traffic or weather related conditions are satisfied. Thus, whether and when an alert 99 is to be delivered is based on the user specified travel routes and alert conditions specified in the user profile saved in the user profile database 49. This user profile information is combined with current 26 and forecast 52 traffic information and current 30 and forecast 54 weather information to determine if and when an alert 99 should be generated and delivered to the user. In general, such alerts 99 may contain more specific and thus less complete but more focused information than a combined traffic and weather forecast report 66 in accordance with the present invention. For example, such an alert may state merely an estimated travel time along a defined route, that an accident has occurred along a defined route, or that traffic affecting weather conditions along a user defined travel route are forecast.

It should be understood that the present invention is not limited to the particular exemplary applications and embodiments as illustrated and described herein, but embraces all such modified forms thereof as come within the scope of the following claims.

What is claimed is:

1. A method for generating a combined traffic and weather report presentation, comprising:
   a) providing weather conditions for a selected time period for a geographic area including at least one defined travel route;
   b) providing traffic conditions along the defined travel route for the selected time period; and
   c) generating a combined traffic and weather presentation displaying simultaneously a representation of the weather conditions and a representation of the traffic conditions along the defined travel route for the selected time period, wherein the combined traffic and weather presentation includes a geographic map background of an area including the defined travel route, a representation of the weather conditions for the defined travel route overlaid on the geographic map background, and a representation of the traffic conditions for the defined travel route overlaid simultaneously on the geographic map background, wherein the representation of the weather conditions is selected from the group of weather presentation formats consisting of weather condition color contours and weather condition icons, and wherein the representation of the traffic conditions is selected from the group of traffic presentation formats consisting of colors indicating travel speeds along the defined travel route and traffic affecting condition icons.

2. The method of claim 1 wherein the selected time period is a future time period, the weather conditions are forecast weather conditions, and the traffic conditions are forecast traffic conditions, and wherein generating the combined traffic and weather forecast presentation includes generating a combined traffic and weather forecast presentation displaying simultaneously the forecast weather conditions and the forecast traffic conditions for the defined travel route for the at least one future time period.

3. A method for generating a combined traffic and weather report presentation, comprising:
   a) providing a user profile including a user defined travel route;
   b) providing weather conditions for a selected time period for a geographic area including the user defined travel route;
   c) providing traffic conditions along the user defined travel route for the selected time period; and
   d) generating a combined traffic and weather presentation displaying simultaneously a representation of the weather conditions and a representation of the traffic conditions along the user defined travel route for the selected time period, wherein the selected time period is a future time period, the weather conditions are forecast weather conditions, and the traffic conditions are forecast traffic conditions, and comprising additionally:
   a) deriving from the user profile and the forecast weather conditions a weather forecast for at least one point along the user defined travel route for the at least one future time period; and
   b) deriving from the user profile and the forecast traffic conditions a traffic forecast for the user defined travel route for the at least one future time period; and wherein generating the combined traffic and weather forecast presentation includes generating a combined traffic and weather forecast presentation displaying simultaneously the weather forecast and the traffic forecast for the user defined travel route for the at least one future time period.

4. The method of claim 3 wherein the combined traffic and weather presentation includes a geographic map background of an area including the user defined travel route, a representation of the weather conditions for the user defined travel route overlaid on the geographic map background, and a representation of the traffic conditions for the user defined travel route overlaid simultaneously on the geographic map background.

5. The method of claim 4 wherein the representation of the weather conditions is selected from the group of weather presentation formats consisting of weather condition color contours and weather condition icons.

6. The method of claim 4 wherein the representation of the traffic conditions is selected from the group of traffic presentation formats consisting of colors indicating travel speeds along the user defined travel route and traffic affecting condition icons.

7. The method of claim 3 comprising additionally the step of providing the combined traffic and weather presentation to a user at a personalized internet web page.

8. The method of claim 3 comprising additionally delivering the combined traffic and weather presentation electronically to a user contact address.

9. The method of claim 8 wherein the user contact address is selected from the group of electronic addresses consisting of an e-mail address and a wireless electronic device address.

10. A method for generating a combined traffic and weather report presentation, comprising:
    a) providing a user profile including a user defined travel route;
    b) providing a forecast of weather conditions for a plurality of future time periods for a geographic area including the user defined travel route;
    c) providing a forecast of traffic conditions along the user defined travel route for the plurality of future time periods;
    d) deriving from the user profile and the forecast weather conditions a weather forecast for at least one point along the user defined travel route for the plurality of future time periods;
    e) deriving from the user profile and the forecast traffic conditions a traffic forecast for the user defined travel route for the plurality of future time periods; and
    f) generating a combined traffic and weather forecast presentation displaying simultaneously a representation of the weather forecast and a representation of the traffic forecast along the user defined travel route for the plurality of future time periods.

11. The method of claim 10 wherein the combined traffic and weather forecast presentation includes a tabular presentation displaying simultaneously a representation of the weather conditions and a representation of the traffic conditions along the user defined travel route for the plurality of future time periods.

12. The method of claim 11 wherein the combined traffic and weather presentation includes additionally a graphical display including a geographic map background of an area including the user defined travel route, a representation of the weather conditions for the user defined travel route for a selected one of the plurality of future time periods overlaid on the geographic map background, and a representation of the traffic conditions for the user defined travel route for the selected one of the plurality of future time periods overlaid simultaneously on the geographic map background.

13. The method of claim 12 wherein the representation of the weather conditions in the graphical display is selected from the group of weather presentation formats consisting of weather condition color contours and weather condition icons.

14. The method of claim 12 wherein the representation of the traffic conditions in the graphical display is selected from the group of traffic presentation formats consisting of colors indicating travel speeds along the user defined travel route and traffic affecting condition icons.

15. The method of claim 12 comprising selecting the selected one of the plurality of future time periods by selecting a one of the plurality of future time periods from among the plurality of future time periods represented in the tabular presentation.

16. The method of claim 10 wherein the plurality of future time periods are one hour time periods.

17. The method of claim 10 wherein the representation of the weather forecast in the combined traffic and weather forecast presentation includes at least one representation of a forecast weather condition selected from the group of weather conditions consisting of temperature, wind speed, wind direction, sky conditions, precipitation and humidity.

18. The method of claim 10 wherein the representation of the traffic forecast in the combined traffic and weather forecast presentation includes at least one representation of a forecast traffic condition selected from the group of traffic conditions consisting of travel speed and travel time along the user defined travel route.

19. The method of claim 10 comprising additionally the step of providing the combined traffic and weather forecast presentation to a user at a personalized internet web page.

20. The method of claim 10 comprising additionally delivering the combined traffic and weather forecast presentation electronically to a user contact address.

21. The method of claim 20 wherein the user contact address is selected from the group of electronic addresses consisting of an e-mail address and a wireless electronic device address.

22. A method for generating a traffic and weather alert, comprising:
  a) providing a user profile including a user defined travel route and traffic and weather alert conditions;
  b) providing weather conditions for a selected time period for a geographic area including the user defined travel route;
  c) providing traffic conditions along the user defined travel route for the selected time period;
  d) generating a traffic and weather alert if the weather conditions and traffic conditions satisfy the user defined traffic and weather alert conditions; and
  e) delivering the traffic and weather alert to a user contact address.

23. The method of claim 22 wherein the selected time period is a future time period, the weather conditions are forecast weather conditions, and the traffic conditions are forecast traffic conditions, and comprising additionally:
  a) deriving from the user profile and the forecast weather conditions a weather forecast for at least one point along the user defined travel route for the at least one future time period; and
  b) deriving from the user profile and the forecast traffic conditions a traffic forecast for the user defined travel route for the at least one future time period; and wherein generating the traffic and weather alert includes generating the traffic and weather alert if the traffic and weather alert conditions are satisfied by the weather forecast and the traffic forecast for the user defined travel route for the at least one future time period.

24. The method of claim 22 wherein the user contact address is selected from the group of electronic addresses consisting of an e-mail address and a wireless electronic device address.

* * * * *